(12) United States Patent
Wang et al.

(10) Patent No.: US 11,054,591 B2
(45) Date of Patent: Jul. 6, 2021

(54) SINGLE-FIBER BIDIRECTIONAL MULTIMODE WDM OPTICAL-TO-ELECTRICAL CONVERTER AND FABRICATION METHOD THEREOF

(71) Applicant: HANGZHOU MO-LINK TECHNOLOGY CO. LTD, Hangzhou (CN)

(72) Inventors: Hao Wang, Hangzhou (CN); Dong Wang, Hangzhou (CN)

(73) Assignee: HANGZHOU MO-LINK TECHNOLOGY CO. LTD, Hangzhou (CN)

( * ) Notice: Subject to any disclaimer, the term of this patent is extended or adjusted under 35 U.S.C. 154(b) by 0 days.

(21) Appl. No.: 16/807,480

(22) Filed: Mar. 3, 2020

(65) Prior Publication Data
US 2021/0018704 A1    Jan. 21, 2021

(30) Foreign Application Priority Data
Jul. 19, 2019   (CN) .......................... 201910657335.3

(51) Int. Cl.
| G02B 6/42 | (2006.01) |
| H04B 10/25 | (2013.01) |
| G02B 6/293 | (2006.01) |
| H04B 10/2581 | (2013.01) |
| H04J 14/02 | (2006.01) |

(52) U.S. Cl.
CPC .......... *G02B 6/4246* (2013.01); *G02B 6/2938* (2013.01); *G02B 6/423* (2013.01); *G02B 6/428* (2013.01); *H04B 10/2581* (2013.01); *H04B 10/2589* (2020.05); *H04J 14/02* (2013.01)

(58) Field of Classification Search
None
See application file for complete search history.

(56) References Cited

U.S. PATENT DOCUMENTS

| 5,611,006 A * | 3/1997 | Tabuchi | ............... G02B 6/4204 257/432 |
| 6,198,864 B1 * | 3/2001 | Lemoff | .............. G02B 6/29367 385/24 |

(Continued)

*Primary Examiner* — Chad H Smith
(74) *Attorney, Agent, or Firm* — Li & Cai Intellectual Property (USA) Office (57) ABSTRACT

Provided are a single-fiber bidirectional multimode WDM optical-to-electrical converter and a fabrication method thereof. The converter includes: a PCBA, a deflection lens module, a WDM module, and a second collimation lens. The PCBA has an electrical connector, an optical fiber connector, first positioning portions, a plurality of lasers, and a plurality of photodiodes. The deflection lens module has a light incident surface, a reflecting surface, a light emergent surface, and first fitting portions. The deflection lens module is mounted on the PCBA through engagement of the first fitting portions and the first positioning portions, and a plurality of first collimation lenses is aligned with the plurality of lasers and the plurality of photodiodes. The fabrication method includes: mounting lasers and photodiodes on a PCB with respect to first positioning portions on the PCB; and mounting a deflection lens module on the PCB through the first positioning portions.

8 Claims, 8 Drawing Sheets

(56) References Cited

U.S. PATENT DOCUMENTS

| | | | | | |
|---|---|---|---|---|---|
| 6,282,000 | B1* | 8/2001 | Kikuchi | | G02B 6/4246 398/136 |
| 7,013,069 | B1* | 3/2006 | He | | G02B 6/29362 385/33 |
| 9,798,087 | B1* | 10/2017 | Mathai | | G02B 6/4215 |
| 10,120,149 | B1* | 11/2018 | Mathai | | G02B 6/2938 |
| 2001/0043778 | A1* | 11/2001 | Griffis | | G02B 6/29367 385/76 |
| 2002/0018625 | A1* | 2/2002 | Grann | | G02B 6/29358 385/88 |
| 2002/0018635 | A1* | 2/2002 | Hsieh | | G02B 6/29367 385/137 |
| 2002/0110313 | A1* | 8/2002 | Anigbo | | G02B 6/29362 385/24 |
| 2002/0118915 | A1* | 8/2002 | Sagan | | G02B 6/2938 385/24 |
| 2002/0131180 | A1* | 9/2002 | Goodman | | G02B 6/29367 359/634 |
| 2003/0063844 | A1* | 4/2003 | Caracci | | G02B 6/29362 385/24 |
| 2003/0152336 | A1* | 8/2003 | Gurevich | | G02B 6/4246 385/88 |
| 2004/0042736 | A1* | 3/2004 | Capewell | | G02B 6/4215 385/89 |
| 2004/0101247 | A1* | 5/2004 | Chen | | G02B 6/32 385/47 |
| 2004/0165828 | A1* | 8/2004 | Capewell | | G02B 6/29367 385/47 |
| 2005/0089268 | A1* | 4/2005 | Chen | | G02B 6/2938 385/24 |
| 2005/0175347 | A1* | 8/2005 | Ray | | G02B 6/4206 398/88 |
| 2006/0013541 | A1* | 1/2006 | Plickert | | G02B 6/4246 385/89 |
| 2006/0088255 | A1* | 4/2006 | Wu | | G02B 6/4215 385/92 |
| 2006/0274999 | A1* | 12/2006 | Wu | | G02B 6/4246 385/92 |
| 2007/0053690 | A1* | 3/2007 | Zhu | | G02B 6/4246 398/85 |
| 2008/0226228 | A1* | 9/2008 | Tamura | | G02B 6/4214 385/33 |
| 2011/0058771 | A1* | 3/2011 | Lee | | G02B 6/4215 385/33 |
| 2012/0189306 | A1* | 7/2012 | Du | | H01S 5/4025 398/65 |
| 2012/0189314 | A1* | 7/2012 | Xu | | G02B 6/4215 398/135 |
| 2012/0189323 | A1* | 7/2012 | Xu | | G02B 6/4206 398/201 |
| 2013/0064507 | A1* | 3/2013 | Mahnkopf | | G02B 6/12007 385/52 |
| 2013/0077978 | A1* | 3/2013 | Duis | | H04B 10/40 398/139 |
| 2013/0094864 | A1* | 4/2013 | Duis | | H04B 10/40 398/139 |
| 2013/0121651 | A1* | 5/2013 | Takahashi | | G02B 6/262 385/89 |
| 2013/0230327 | A1* | 9/2013 | Shin | | G02B 6/4246 398/79 |
| 2014/0126917 | A1* | 5/2014 | Sato | | G02B 6/4257 398/182 |
| 2015/0346442 | A1* | 12/2015 | Tamura | | H01S 5/02253 385/24 |
| 2016/0028489 | A1* | 1/2016 | Saeki | | G02B 6/4265 398/79 |
| 2016/0047989 | A1* | 2/2016 | Hallstein | | G02B 6/29307 385/24 |
| 2016/0119074 | A1* | 4/2016 | McColloch | | G02B 6/4206 398/88 |
| 2016/0294477 | A1* | 10/2016 | Mizobuchi | | G02B 6/4246 |
| 2016/0316191 | A1* | 10/2016 | McColloch | | G02B 7/003 |
| 2016/0349470 | A1* | 12/2016 | Cheng | | G02B 6/4204 |
| 2017/0017053 | A1* | 1/2017 | Li | | G02B 6/4292 |
| 2017/0048015 | A1* | 2/2017 | O'Daniel | | H04B 10/40 |
| 2017/0059394 | A1* | 3/2017 | Ho | | G02B 6/4284 |
| 2017/0063464 | A1* | 3/2017 | Ho | | G02B 6/4263 |
| 2017/0082808 | A1* | 3/2017 | Kang | | G02B 6/29365 |
| 2017/0131492 | A1* | 5/2017 | Vallance | | G02B 6/4214 |
| 2017/0134099 | A1* | 5/2017 | Hara | | G02B 6/29367 |
| 2017/0269304 | A1* | 9/2017 | Amit | | G02B 6/4207 |
| 2017/0322381 | A1* | 11/2017 | Saeki | | G02B 6/4201 |
| 2017/0322423 | A1* | 11/2017 | Hallstein | | G02B 6/4246 |
| 2017/0371112 | A1* | 12/2017 | Hwang | | G02B 6/4215 |
| 2018/0059340 | A1* | 3/2018 | Lin | | G02B 6/29395 |
| 2018/0123695 | A1* | 5/2018 | Kubota | | G02B 6/4206 |
| 2018/0149817 | A1* | 5/2018 | Vallance | | G02B 6/4215 |
| 2018/0183540 | A1* | 6/2018 | O'Daniel | | G02B 6/43 |
| 2020/0014484 | A1* | 1/2020 | Chen | | G02B 6/4281 |
| 2020/0363595 | A1* | 11/2020 | Grann | | G02B 6/29367 |

\* cited by examiner

SINGLE-FIBER BIDIRECTIONAL MULTIMODE WDM OPTICAL-TO-ELECTRICAL CONVERTER AND FABRICATION METHOD THEREOF

FIELD OF THE DISCLOSURE

The present disclosure relates to a single-fiber bidirectional multimode WDM optical-to-electrical converter and a fabrication method thereof, belonging to the field of information transmission technologies.

BACKGROUND OF THE DISCLOSURE

With the increasing growth of transmission capacity in the communication field, conventional transmission technologies can hardly meet the requirements on transmission capacity and transmission speed. Currently, data centers, commercial applications, and families have increasingly higher demands on bandwidths, and the applications become diversified. An optical-to-electrical converter is a main component enabling optical communication in a device. The inventor of the present application found during research and development that, the bandwidth is generally increased by using parallel fibers in the related art. For example, 4 optical fibers are used to achieve a bandwidth of 4*10 gbps=40 gbps or 4*25 gbps=100 gbps. However, in some application scenarios, to achieve the same function by using one optical fiber, for example, to increase the bandwidth without changing the cabling of the data center, an effective solution is to adopt a WDM technology. In some other applications, if the fiber length is variable, a conventional active optical cable (AOC) is inapplicable, and an effective solution is to adopt a pluggable optical module. In addition, the alignment accuracy between lasers, photodiodes, and lenses during fabrication needs to fall within ±15 um, preferably, within ±5 um; therefore, how to achieve rapid and accurate assembly needs to be solved urgently.

SUMMARY OF THE DISCLOSURE

To at least eliminate the problems in the related art to some extent, the present application provides a single-fiber bidirectional multimode WDM optical-to-electrical converter and a fabrication method thereof.

According to a first aspect of an embodiment of the present application, the present application provides a single-fiber bidirectional multimode WDM optical-to-electrical converter, including:

a PCBA, having an electrical connector, an optical fiber connector, first positioning portions, a plurality of lasers, and a plurality of photodiodes;

a deflection lens module, having a light incident surface, a reflecting surface, a light emergent surface, and first fitting portions, a plurality of first collimation lenses being disposed on the light incident surface, the light emergent surface being perpendicular to the light incident surface, the deflection lens module being mounted on the PCBA through engagement of the first fitting portions and the first positioning portions, and the plurality of first collimation lenses being aligned with the plurality of lasers and the plurality of photodiodes;

a WDM module, having a main optical port and a plurality of individual optical ports, the WDM module being mounted on the PCBA, and the plurality of individual optical ports being aligned with the light emergent surface of the deflection lens module; and a second collimation lens, disposed between the optical fiber connector and the main optical port of the WDM module, where the plurality of lasers is driven by information-bearing electrical signals through the electrical connector to emit multiple channels of optical signals of different frequencies, the multiple channels of optical signals are collimated and reflected by the deflection lens module and are then combined by the WDM module into a single channel of optical signals, and the single channel of optical signals are converged by the second collimation lens before entering an optical fiber of the optical fiber connector;

a single channel of optical signals received from an optical fiber are collimated by the second collimation lens and are then separated by the WDM module into multiple channels of optical signals of different frequencies, the multiple channels of optical signals are reflected and converged by the deflection lens module before entering the plurality of photodiodes and are then converted by the photodiodes into electrical signals correspondingly, and the electrical signals are output by the electrical connector.

Further, the WDM module is assembled with the PCBA and is assembled and aligned with the deflection lens module through a mounting base, second positioning portions are disposed on an end surface of the mounting base opposite to the deflection lens module, and second fitting portions to be engaged with the second positioning portions are disposed on an end portion of the deflection lens module where the light emergent surface is located.

Further, a top portion of the mounting base is recessed downward to form an accommodating cavity of the WDM module, an edge of an opening portion of the accommodating cavity extends inward to form a baffle portion, and the accommodating cavity has positioning side surfaces matching with side surfaces of the WDM module to locate the WDM module.

Further, the WDM module includes a substrate and films, the substrate being in a parallelepiped structure.

Further, the deflection lens module is in an integrated structure.

Further, the deflection lens module includes a base board, a first recessed portion is formed on a top surface of the base board, a second recessed portion is formed on a bottom surface of the base board, the reflecting surface is formed by a side surface of the first recessed portion, the light incident surface is formed by a top surface of the second recessed portion, hemispherical protrusions serving as the first collimation lenses are formed on the light incident surface, and the light emergent surface is formed by a side surface of the base board.

Further, the first positioning portions are pinholes, and the first fitting portions are pins.

Further, the second positioning portions are pins or pinholes, and the second fitting portions are pinholes or pins.

According to a second aspect of an embodiment of the present application, the present application further provides a fabrication method of a single-fiber bidirectional multimode WDM optical-to-electrical converter, including the following steps:

mounting lasers and photodiodes on a PCB with respect to first positioning portions on the PCB;

mounting a deflection lens module on the PCB through the first positioning portions; and mounting a WDM module with respect to the deflection lens module.

Further, a method of mounting the WDM module includes:

disposing the WDM module in an accommodating cavity on the mounting base, attaching side surfaces of the WDM module to positioning side surfaces of the accommodating cavity to locate the WDM module, and fixing the WDM module by adhesion; and engaging second positioning portions on the mounting base with second fitting portions on the deflection lens module, to locate and assemble the mounting base and the deflection lens module.

It can be seen from the foregoing specific embodiments of the present application that, the present application at least has the following beneficial effects. The optical-to-electrical converter of the present application integrates components for sending, transmitting, and receiving optical signals, to achieve standardization of the optical-to-electrical converter, simplify its design, and meet different application requirements. In use, the optical-to-electrical converter of the present application can be directly connected to an external circuit, to effectively reduce the time and cost of research and development. Moreover, the converter of the present application has the first positioning portions and the first fitting portions engaged to achieve rapid assembly of the photodiodes, lasers, PCB, and deflection lens module as well as accurate alignment of optical paths. In addition, according to the present application, the WDM module is mounted through the mounting base, and rapid assembly of the WDM module as well as accurate alignment of optical paths can be achieved through the positioning side surfaces and the second positioning portions of the mounting base.

It should be noted that, the above general descriptions and the following specific embodiments are merely exemplary and explanatory, and are not intended to limit the scope of the present application.

BRIEF DESCRIPTION OF THE DRAWINGS

The accompanying drawings below are a part of the specification of the present application and are used to explain the embodiments of the present application. The principle of the present application is illustrated by the accompanying drawings and the description of the specification.

DETAILED DESCRIPTION OF THE EXEMPLARY EMBODIMENTS

In order to make the objectives, technical solutions, and advantages of the embodiments of the present application clearer, the spirit of the disclosure of the present application is explicitly illustrated below with reference to the accompanying drawings and detailed descriptions. Based on understandings of the embodiments of the present application, persons skilled in the art can make variations and modifications according to the technologies disclosed by the present application, and these variations and modifications do not depart from the spirit and scope of the present application.

The exemplary embodiments of the present application and the descriptions thereof are intended to explain the present application, instead of limiting the present application. In addition, elements/components denoted by using the same or similar symbols in the accompanying drawings and embodiments represent the same or similar parts.

The terms "first", "second", and the like in the text do not denote any particular order or sequence, and are not intended to limit the present application. They are used only for distinguishing between elements or operations described with the same technical terms.

The directional terms such as "up", "down", "left", "right", "front" and "back" in the text merely indicate directions with reference to the accompanying drawings. Therefore, such terms are used for illustration instead of limiting the present disclosure.

The terms such as "comprise", "include", "have", and "contain" in the text are open terms, and can be explained as "include but not limited to".

The term "and/or" in the text includes any or all of the combinations of the described objects.

The term "a plurality of" in the text includes "two" and "more than two"; and the term "multiple groups" in the text includes "two groups" and "more than two groups".

The terms such as "approximately" and "about" in the text are used for modifying any slightly variable quantity or error, and such slight variation or error leads to no essential change. Generally, the range of slight variations or errors modified by these terms may be 20% in some embodiments, 10% in other embodiments, and 5% or other values in some other embodiments. Persons skilled in the art should understand that, the foregoing numerical values can be adjusted according to actual requirements and the present disclosure is not limited thereto.

Some terms used for describing the present application are discussed below or elsewhere in this specification, to provide additional guidance to persons skilled in the art upon the description of the present application.

Figure 1:
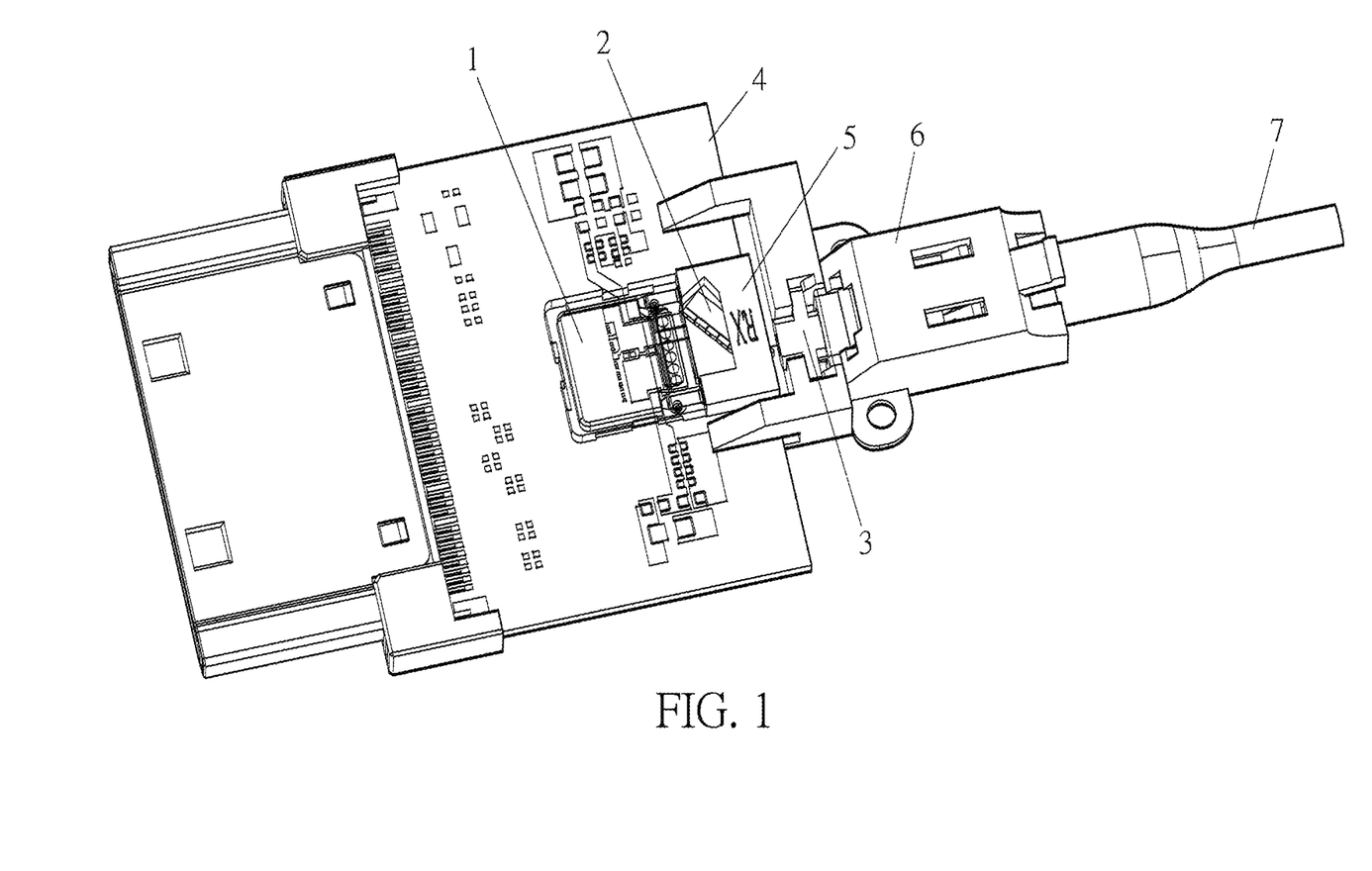
FIG. 1 is a first schematic diagram of a single-fiber bidirectional multimode WDM optical-to-electrical converter according to a specific embodiment of the present application.

FIG. 1 is a schematic diagram illustrating an embodiment of a single-fiber bidirectional multimode WDM optical-to-electrical converter according to the present application. As shown in FIG. 1, the single-fiber bidirectional multimode WDM optical-to-electrical converter includes: a PCBA 4, a deflection lens module 1, a WDM module 2, a second collimation lens 3, a mounting base 5 for mounting the WDM module 2, and an optical fiber connector 6 for connecting an optical fiber 7.

Figure 2:
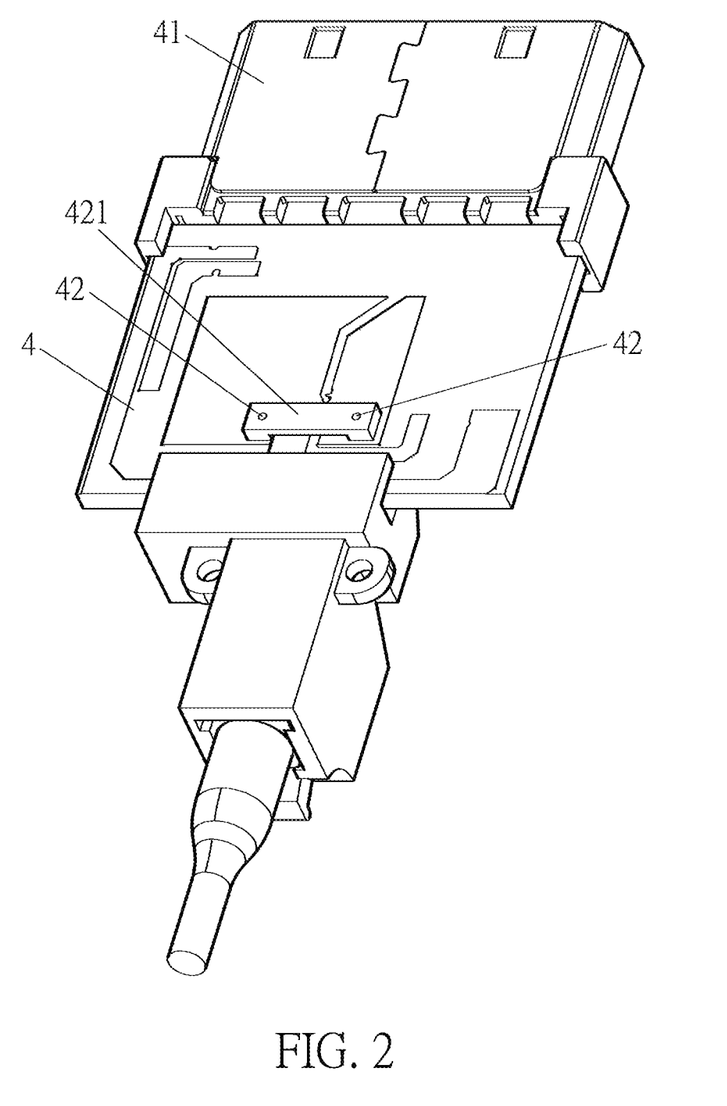
FIG. 2 is a second schematic diagram of the single-fiber bidirectional multimode WDM optical-to-electrical converter according to a specific embodiment of the present application.
Figure 3:
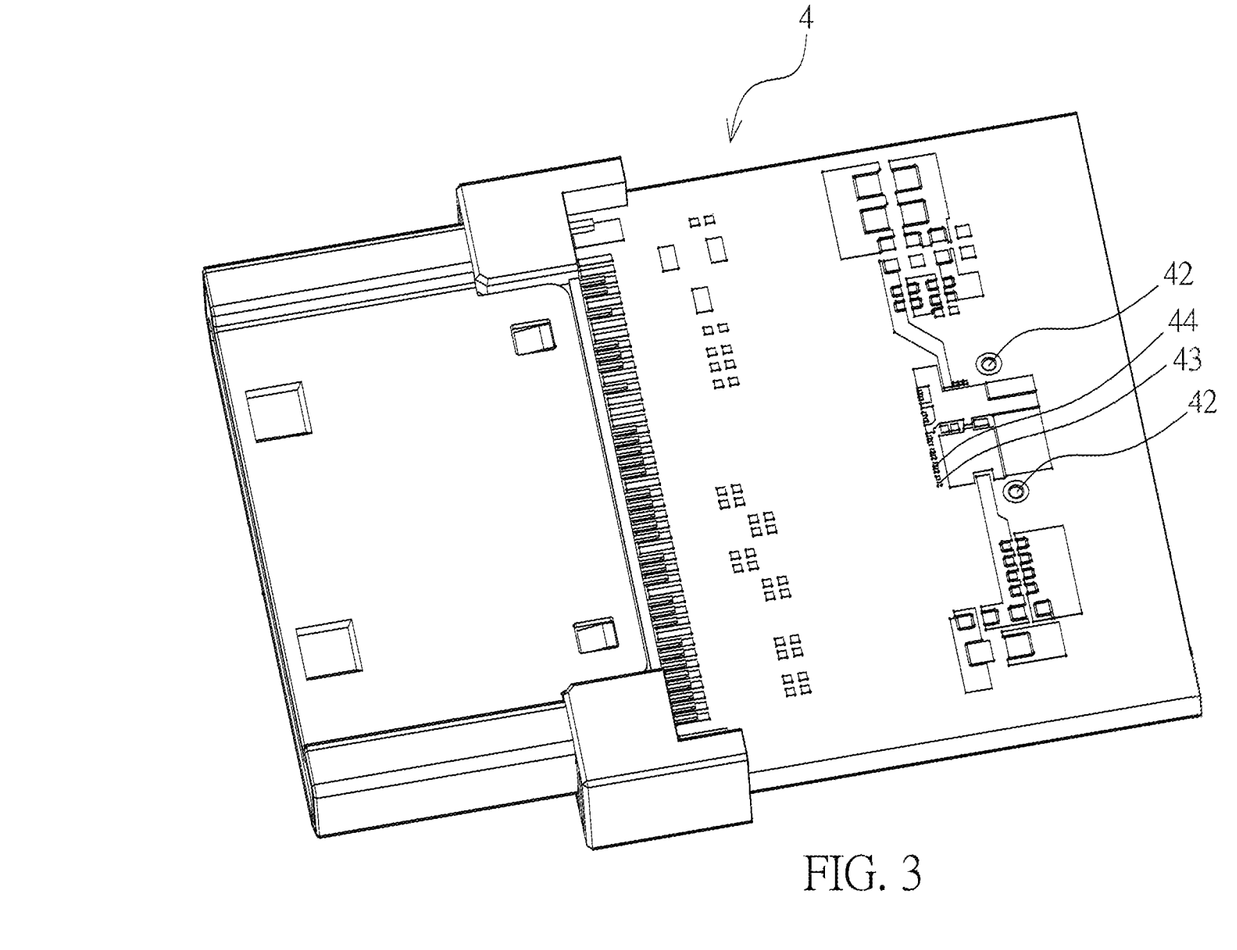
FIG. 3 is a schematic diagram of a PCBA in the single-fiber bidirectional multimode WDM optical-to-electrical converter according to a specific embodiment of the present application.

As shown in FIG. 2 and FIG. 3, the PCBA 4 has an electrical connector 41, first positioning portions 42, a plurality of lasers 43, and a plurality of photodiodes 44.

Figure 4:
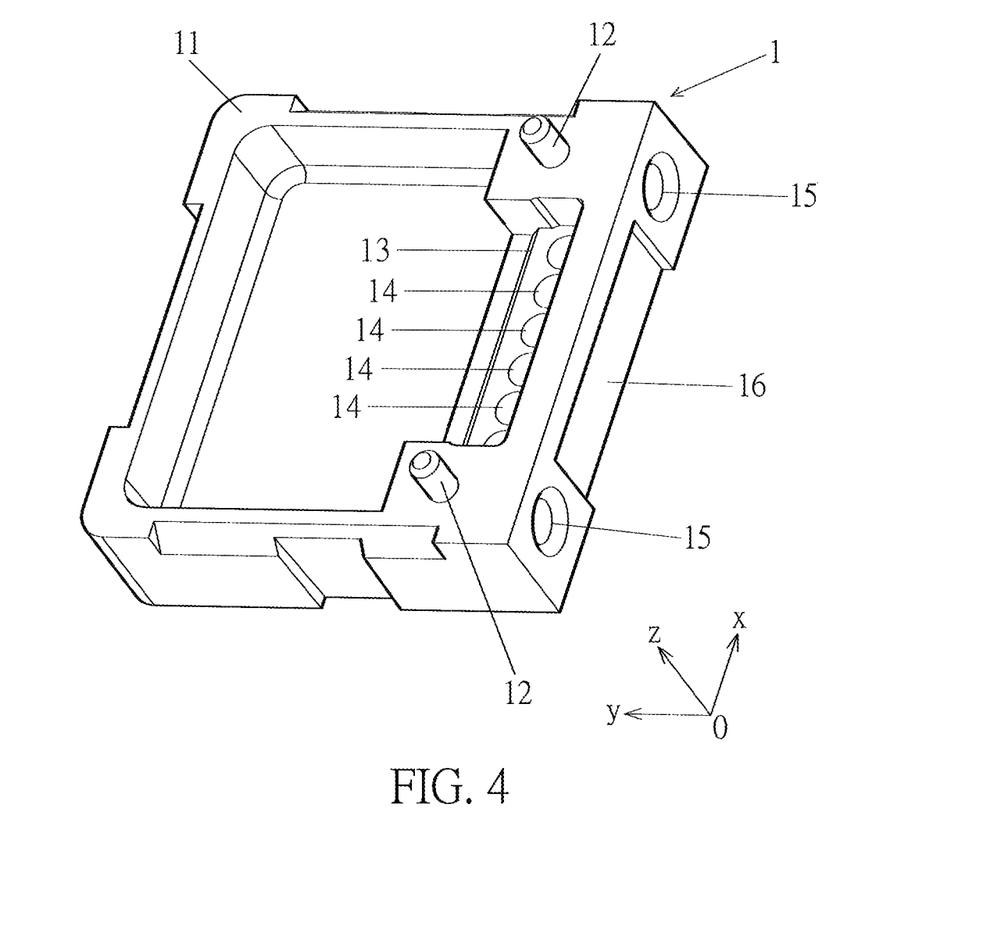
FIG. 4 is a first schematic diagram of a deflection lens module in the single-fiber bidirectional multimode WDM optical-to-electrical converter according to a specific embodiment of the present application.
Figure 5:
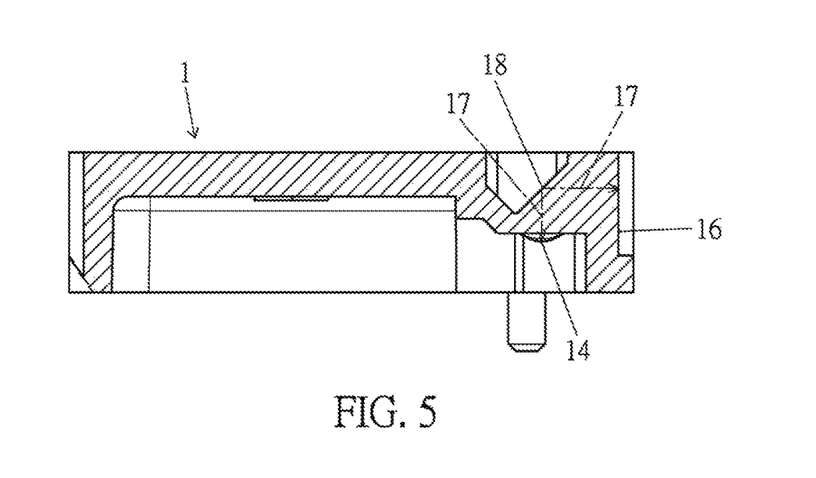
FIG. 5 is a second schematic diagram of the deflection lens module in the single-fiber bidirectional multimode WDM optical-to-electrical converter according to a specific embodiment of the present application.

As shown in FIG. 4 and FIG. 5, the deflection lens module 1 has a light incident surface 13, a reflecting surface 18, a light emergent surface 16, and first fitting portions 12. A plurality of first collimation lenses 14 is disposed on the light incident surface 13. The light emergent surface 16 is perpendicular to the light incident surface 13. The deflection path of optical signals in the deflection lens module 1 is marked by reference numerals 17 in FIG. 5.

Figure 11:
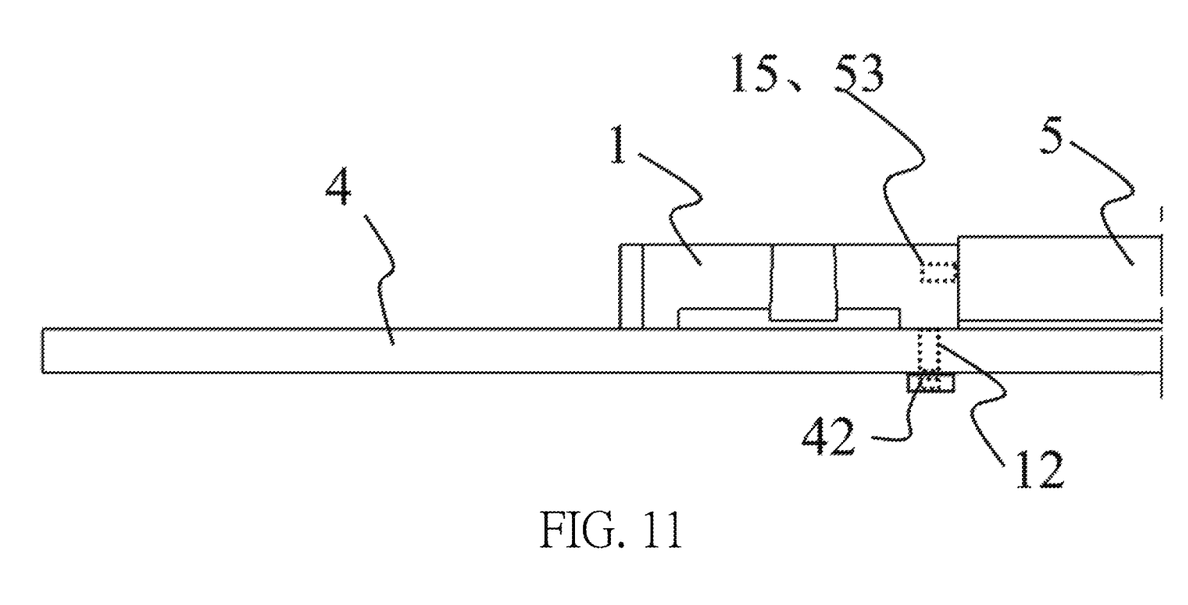
FIG. 11 is a schematic diagram illustrating assembly of the deflection lens module, the mounting base, and the PCBA in the single-fiber bidirectional multimode WDM optical-to-electrical converter according to a specific embodiment of the present application.

Further referring to FIG. 4, FIG. 5, and FIG. 11, the deflection lens module 1 is mounted on the PCBA 4 through engagement of the first fitting portions 12 and the first positioning portions 42, and the plurality of first collimation lenses 14 is aligned with the plurality of lasers 43 and the plurality of photodiodes 44. The first fitting portions 12 are pins, and the first positioning portions 42 are pinholes. The pinholes include first pinholes on the PCBA 4 and second pinholes on a small base board 421, the small base board 421 is fixed by adhesion on the back of the PCBA 4, and the second pinholes and the first pinholes are preferably concentric.

Based on the above structure, during fabrication, the lasers 43 and the photodiodes 44 are mounted on the PCB with respect to the first positioning portions (the second pinholes) on the PCB. The pins (the first fitting portions 12) on the deflection lens module 1 pass through the first pinholes on the PCBA 4 and are inserted into the second pinholes on the small base board 421 to be closely engaged with the second pinholes. Thereby, the deflection lens module 1 is mounted on the PCBA 4, and the plurality of first collimation lenses 14 is automatically aligned with the plurality of lasers 43 and the plurality of photodiodes 44.

Figure 6:
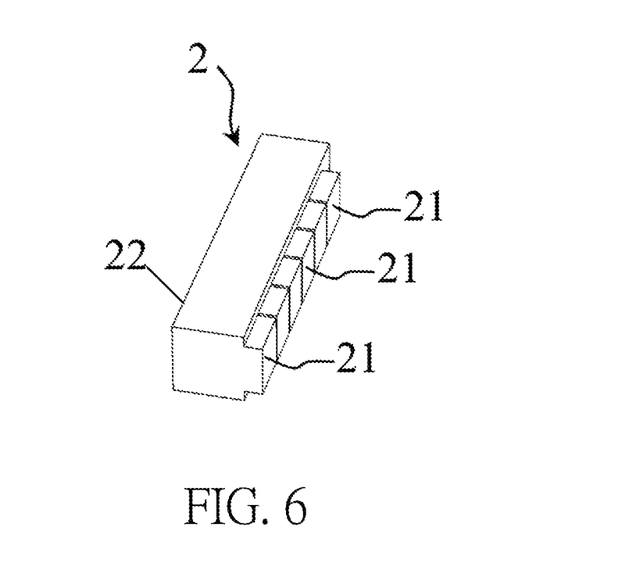
FIG. 6 is a schematic diagram of a WDM module in the single-fiber bidirectional multimode WDM optical-to-electrical converter according to a specific embodiment of the present application.

Further referring to FIG. 6, FIG. 4, and FIG. 11, the WDM module 2 has a main optical port 22 and a plurality of individual optical ports 21. The WDM module 2 is mounted on the PCBA 4, and the plurality of individual optical ports 21 is aligned with the light emergent surface 16 of the deflection lens module 1.

Figure 7:
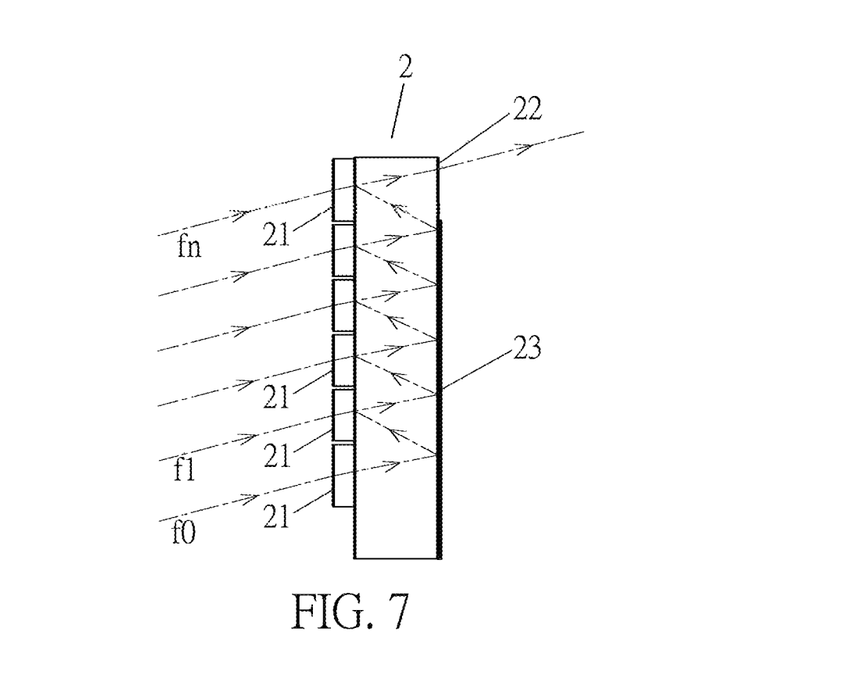
FIG. 7 is a diagram illustrating the principle of combining optical signals by the WDM module.
Figure 8:
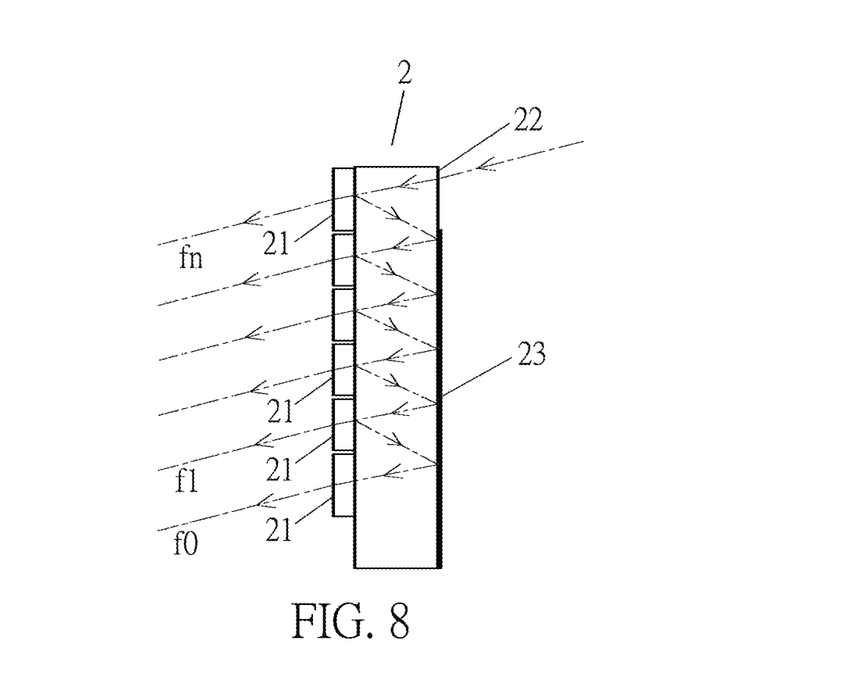
FIG. 8 is a diagram illustrating the principle of separating optical signals by the WDM module.

FIG. 7 illustrates the principle of combining optical signals by the WDM module 2, and FIG. 8 illustrates the principle of separating optical signals by the WDM module 2. Filters of different frequencies are arranged at the individual optical ports 21, and a reflector 23 is provided opposite to the individual optical ports 21. When optical signals are incident on the filter of a frequency fn, only optical signals of the frequency fn pass through the filter, and optical signals of the other frequencies are reflected. As shown in FIG. 7, when multiple channels of optical signals of the frequencies f1, f2, . . . , fn are correspondingly incident from the plurality of individual optical ports 21, the optical signals are transmitted in the WDM module 2 through reflection by the filters and the reflector 23, and are finally combined into one channel of optical signals to be emitted from the main optical port 22. On the contrary, as shown in FIG. 8, when one channel of optical signals are incident from the main optical port 22, the optical signals are transmitted in the WDM module 2 through reflection by the filters and the reflector 23. During this process, the optical signals of the frequencies f1, f2, . . . , fn are respectively emitted from the filters of the frequencies f1, f2, . . . , fn, and thus the one channel of optical signals are separated into multiple channels of optical signals of different frequencies.

As shown in FIG. 1, the second collimation lens 3 is disposed between the optical fiber connector and the main optical port of the WDM module 2, and is used to converge light output from the main optical port of the WDM module 2 and transmit the light into the optical fiber 7, and collimate light received from the optical fiber 7 and transmit the light into the main optical port of the WDM module 2. In an embodiment, the optical fiber connector 6 adopts an LC adapter. The LC adapter is sleeved on the second collimation lens 3 and is fixed to the PCBA 4.

During operation, the plurality of lasers 43 is driven by information-bearing electrical signals through the electrical connector 41 to emit multiple channels of optical signals of different frequencies. The multiple channels of optical signals are correspondingly incident on the plurality of first collimation lenses 14 of the deflection lens module 1, and are collimated before being incident on the reflecting surface 18. The optical signals are then reflected and irradiated to the WDM module 2 through the light emergent surface 16, and enter the WDM module 2 through the plurality of individual optical ports 21 of the WDM module 2 correspondingly. After being combined into a single channel of optical signals, the optical signals are emitted from the main optical port 22, then converged by the second collimation lens 3 before entering the optical fiber 7 of the optical fiber connector 6, and are transmitted by the optical fiber 7. On the contrary, a single channel of optical signals received from the optical fiber 7 are collimated by the second collimation lens 3 before entering the WDM module 2 through the main optical port 22, and are separated into multiple channels of optical signals of different frequencies. The multiple channels of optical signals enter from the light emergent surface 16 of the deflection lens module, and are reflected by the reflecting surface 18 to the light incident surface 13. After being converged by the first collimation lenses 14, the optical signals enter the plurality of photodiodes 44 and are converted into electrical signals correspondingly, and the electrical signals are output from the electrical connector 41.

The optical-to-electrical converter provided by the present application integrates components for sending, transmitting, and receiving optical signals, to achieve standardization of the optical-to-electrical converter, simplify its design, and meet different application requirements. In use, the optical-to-electrical converter of the present application can be directly connected to an external circuit through the electrical connector 41, to effectively reduce the time and cost of research and development. Moreover, the converter of the present application has the first positioning portions 42 and the first fitting portions 12. During assembly, the lasers 43 and the photodiodes 44 are mounted on the PCB with respect to the first positioning portions 42 on the PCB; and the deflection lens module 1 is mounted on the PCB through the first positioning portions 42. Thereby, the photodiodes 44, the lasers 43, the PCB, and the deflection lens module 1 can be rapidly assembled, and accurate alignment of optical paths can also be achieved.

The optical-to-electrical converter further includes a mounting base. The WDM module is assembled with the PCBA 4 and is assembled and aligned with the deflection lens module through the mounting base. Referring to FIG. 1, FIG. 4, FIG. 9, and FIG. 11, second positioning portions 53 are disposed on an end surface of the mounting base 5 opposite to the deflection lens module 1, and second fitting portions 15 to be engaged with the second positioning portions 53 are disposed on an end portion of the deflection lens module 1 where the light emergent surface is located. The second positioning portions 53 are pins, and the second fitting portions 15 are pinholes. The mounting base 5 and the deflection lens module 1 can be rapidly located and assembled through the second positioning portions 53 and the second fitting portions 15.

Figure 9:
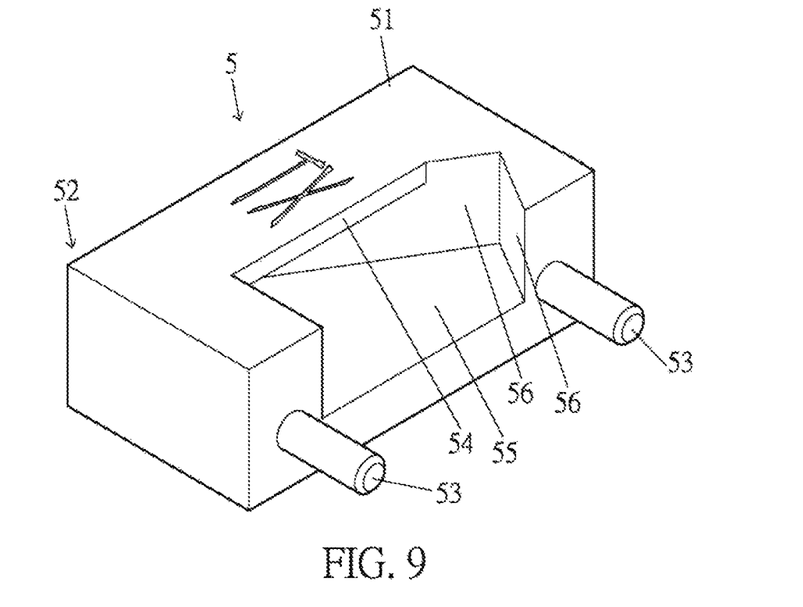
FIG. 9 is a schematic diagram of a mounting base in the single-fiber bidirectional multimode WDM optical-to-electrical converter according to a specific embodiment of the present application.

Further referring to FIG. 9, a top portion 51 of the mounting base 5 is recessed downward to form an accommodating cavity 55 of the WDM module 2, an edge of an opening portion of the accommodating cavity 55 extends inward to form a baffle portion 54, and the accommodating cavity 55 has positioning side surfaces 56 matching with side surfaces of the WDM module 2 to locate the WDM module 2. An output optical port 52 opposite to the main optical port of the WDM module 2 is disposed on one side of the mounting base 5.

During assembly, the WDM module 2 is disposed in the accommodating cavity 55 on the mounting base 5, the side surfaces of the WDM module 2 are attached to the positioning side surfaces 56 of the accommodating cavity 55 to locate the WDM module 2, and the WDM module 2 is fixed by adhesion. The second positioning portions 53 on the mounting base 5 are engaged with the second fitting portions 15 on the deflection lens module 1, to locate and assemble the mounting base 5 and the deflection lens module 1. According to the present application, the WDM module 2 is mounted through the mounting base 5, and rapid assembly of the WDM module 2 as well as accurate alignment of optical paths can be achieved through the positioning side surfaces 56 and the second positioning portions 53 of the mounting base 5.

The WDM module 2 includes a substrate and films. The films include filter films arranged at the individual optical ports and a reflective film disposed on the opposite side. The substrate is in a parallelepiped structure, to better match with the positioning side surfaces 56 of the mounting base 5, thereby achieving rapid assembly and accurate location of the WDM module 2 and the mounting base 5.

Further referring to FIG. 4 and FIG. 5, the deflection lens module 1 is in an integrated structure, facilitating the assembly with other components. The deflection lens module 1 of an integrated structure includes a base board 11, a first recessed portion is formed on a top surface of the base board 11, a second recessed portion is formed on a bottom surface of the base board 11, the reflecting surface 18 is formed by a side surface of the first recessed portion, the light incident surface 13 is formed by a top surface of the second recessed portion, hemispherical protrusions serving as the first collimation lenses 14 are formed on the light incident surface 13, and the light emergent surface 16 is formed by a side surface of the base board 11. This structure can be conveniently processed to form the light incident surface 13, the light emergent surface 16, and the first collimation lenses 14, and the reflecting surface 18 can be easily formed by coating a reflective material on the side surface of the first recessed portion. The fabrication process is simple.

Figure 10:
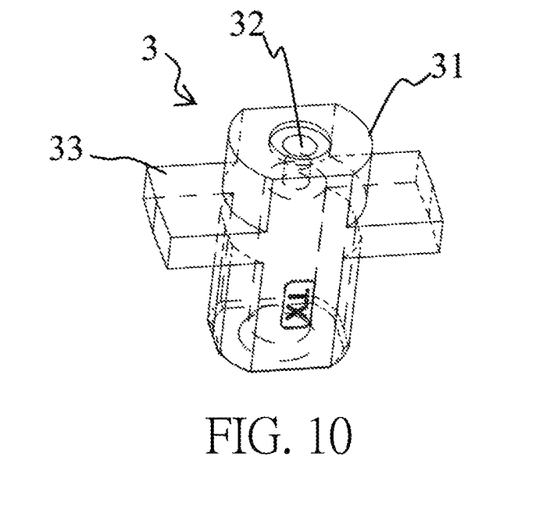
FIG. 10 is a schematic diagram of a second collimation lens in the single-fiber bidirectional multimode WDM optical-to-electrical converter according to a specific embodiment of the present application.

FIG. 10 shows a second collimation lens. As shown in FIG. 10, the second collimation lens 3 has a main body 31 with a through-hole 32 for mounting an optical fiber, a lens is located in the through-hole 32, and mounting tabs 33 are formed on two sides of the main body 31.

The present application further provides a fabrication method of the single-fiber bidirectional multimode WDM optical-to-electrical converter, including the following steps:

Step S1: mounting lasers and photodiodes on a PCB with respect to first positioning portions on the PCB;

Step S2: mounting a deflection lens module on the PCB through the first positioning portions; and Step S3: mounting a WDM module with respect to the deflection lens module.

In Step S3, a method of mounting the WDM module includes: disposing the WDM module in an accommodating cavity on the mounting base, attaching side surfaces of the WDM module to positioning side surfaces of the accommodating cavity to locate the WDM module, and fixing the WDM module by adhesion; and engaging second positioning portions on the mounting base with second fitting portions on the deflection lens module, to locate and assemble the mounting base and the deflection lens module.

The present disclosure has been described in detail above with the specific embodiments. The detailed descriptions are merely used by persons skilled in the art to understand the content of the present disclosure, and are not intended to limit the protection scope of the present disclosure. Any modification, equivalent change, and the like made to the above solutions by persons skilled in the art according to the concept of the present disclosure shall fall within the protection scope of the present disclosure.

What is claimed is:

1. A single-fiber bidirectional multimode WDM optical-to-electrical converter, comprising:
   a PCBA (4), having an electrical connector (41), an optical fiber connector (6), first positioning portions (42), a plurality of lasers (43), and a plurality of photodiodes (44);
   a deflection lens module (1), having a light incident surface (13), a reflecting surface (18), a light emergent surface (16), and first fitting portions (12), a plurality of first collimation lenses (14) being disposed on the light incident surface, the light emergent surface being perpendicular to the light incident surface, the deflection lens module being mounted on the PCBA through engagement of the first fitting portions and the first positioning portions, and the plurality of first collimation lenses being aligned with the plurality of lasers and the plurality of photodiodes;
   a WDM module (2), having a main optical port (22) and a plurality of individual optical ports (21), the WDM module being mounted on the PCBA, and the plurality of individual optical ports being aligned with the light emergent surface of the deflection lens module; and
   a second collimation lens (3), disposed between the optical fiber connector and the main optical port of the WDM module, wherein
   the plurality of lasers is driven by information-bearing electrical signals through the electrical connector to emit multiple channels of optical signals of different frequencies, the multiple channels of optical signals are collimated and reflected by the deflection lens module and are then combined by the WDM module into a single channel of optical signals, and the single channel of optical signals are converged by the second collimation lens before entering an optical fiber of the optical fiber connector;

a single channel of optical signals received from an optical fiber are collimated by the second collimation lens and are then separated by the WDM module into multiple channels of optical signals of different frequencies, the multiple channels of optical signals are reflected and converged by the deflection lens module before entering the plurality of photodiodes and are then converted by the photodiodes into electrical signals correspondingly, and the electrical signals are output by the electrical connector.

2. The single-fiber bidirectional multimode WDM optical-to-electrical converter according to claim 1, wherein the WDM module (2) is assembled with the PCBA and is assembled and aligned with the deflection lens module (1) through a mounting base (5), second positioning portions (53) are disposed on an end surface of the mounting base opposite to the deflection lens module, and second fitting portions (15) to be engaged with the second positioning portions are disposed on an end portion of the deflection lens module (1) where the light emergent surface is located.

3. The single-fiber bidirectional multimode WDM optical-to-electrical converter according to claim 2, wherein a top portion of the mounting base (5) is recessed downward to form an accommodating cavity (55) of the WDM module, an edge of an opening portion of the accommodating cavity extends inward to form a baffle portion (54), and the accommodating cavity has positioning side surfaces (56) matching with side surfaces of the WDM module to locate the WDM module.

4. The single-fiber bidirectional multimode WDM optical-to-electrical converter according to claim 3, wherein the WDM module comprises a substrate and films, the substrate being in a parallelepiped structure.

5. The single-fiber bidirectional multimode WDM optical-to-electrical converter according to claim 1, wherein the deflection lens module is in an integrated structure.

6. The single-fiber bidirectional multimode WDM optical-to-electrical converter according to claim 5, wherein the deflection lens module (1) comprises a base board (11), a first recessed portion is formed on a top surface of the base board, a second recessed portion is formed on a bottom surface of the base board, the reflecting surface (18) is formed by a side surface of the first recessed portion, the light incident surface (13) is formed by a top surface of the second recessed portion, hemispherical protrusions serving as the first collimation lenses (14) are formed on the light incident surface, and the light emergent surface (16) is formed by a side surface of the base board.

7. The single-fiber bidirectional multimode WDM optical-to-electrical converter according to claim 1, wherein the first positioning portions (42) are pinholes, and the first fitting portions (12) are pins.

8. The single-fiber bidirectional multimode WDM optical-to-electrical converter according to claim 2, wherein the second positioning portions are pins or pinholes, and the second fitting portions are pinholes or pins.

* * * * *